June 7, 1932.  E. F. HUDDLE  1,862,186
EXTENSION CONTROL FOR TRACTOR DRAWN HARVESTERS
Filed July 8, 1927  2 Sheets-Sheet 1
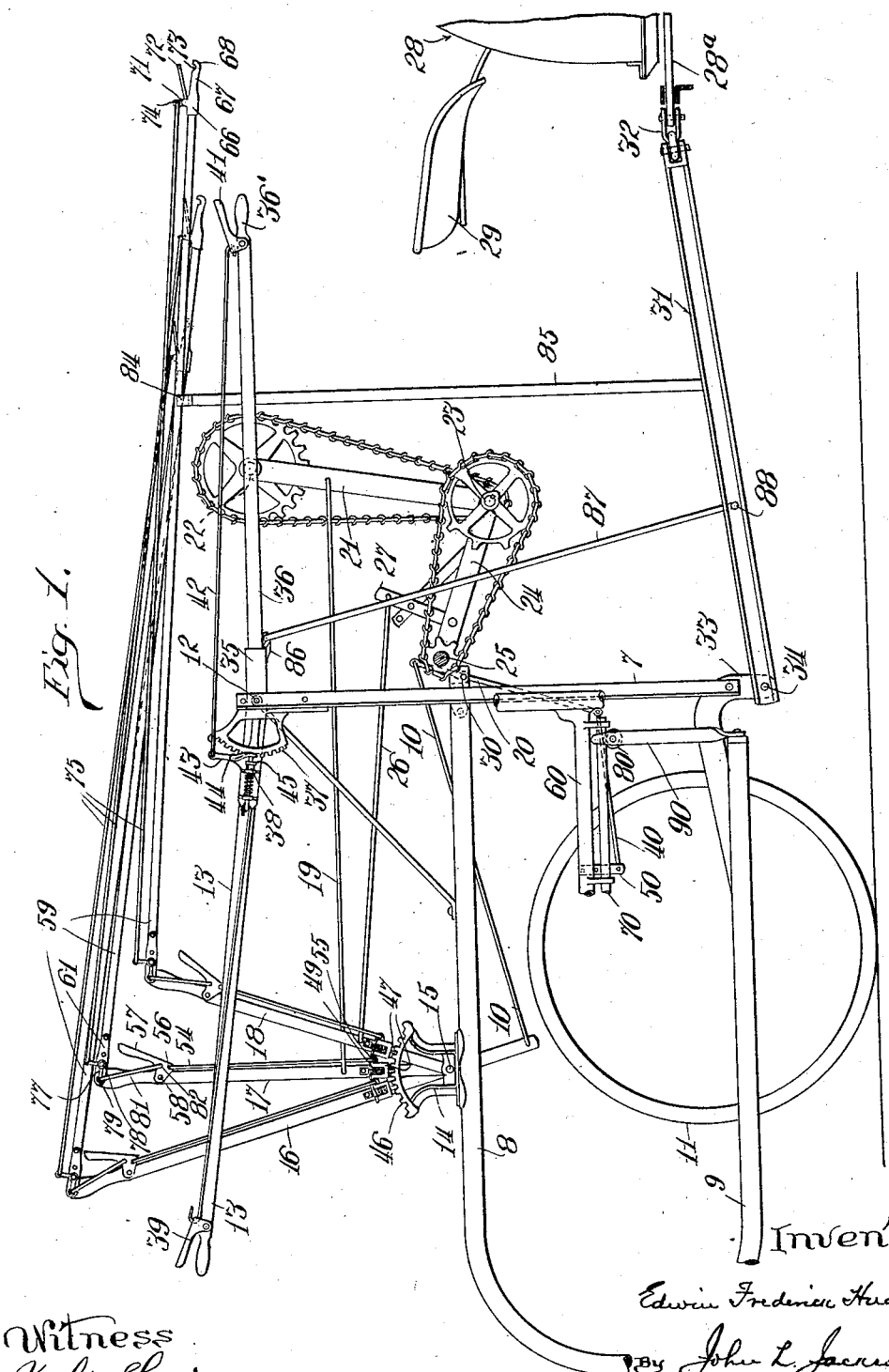

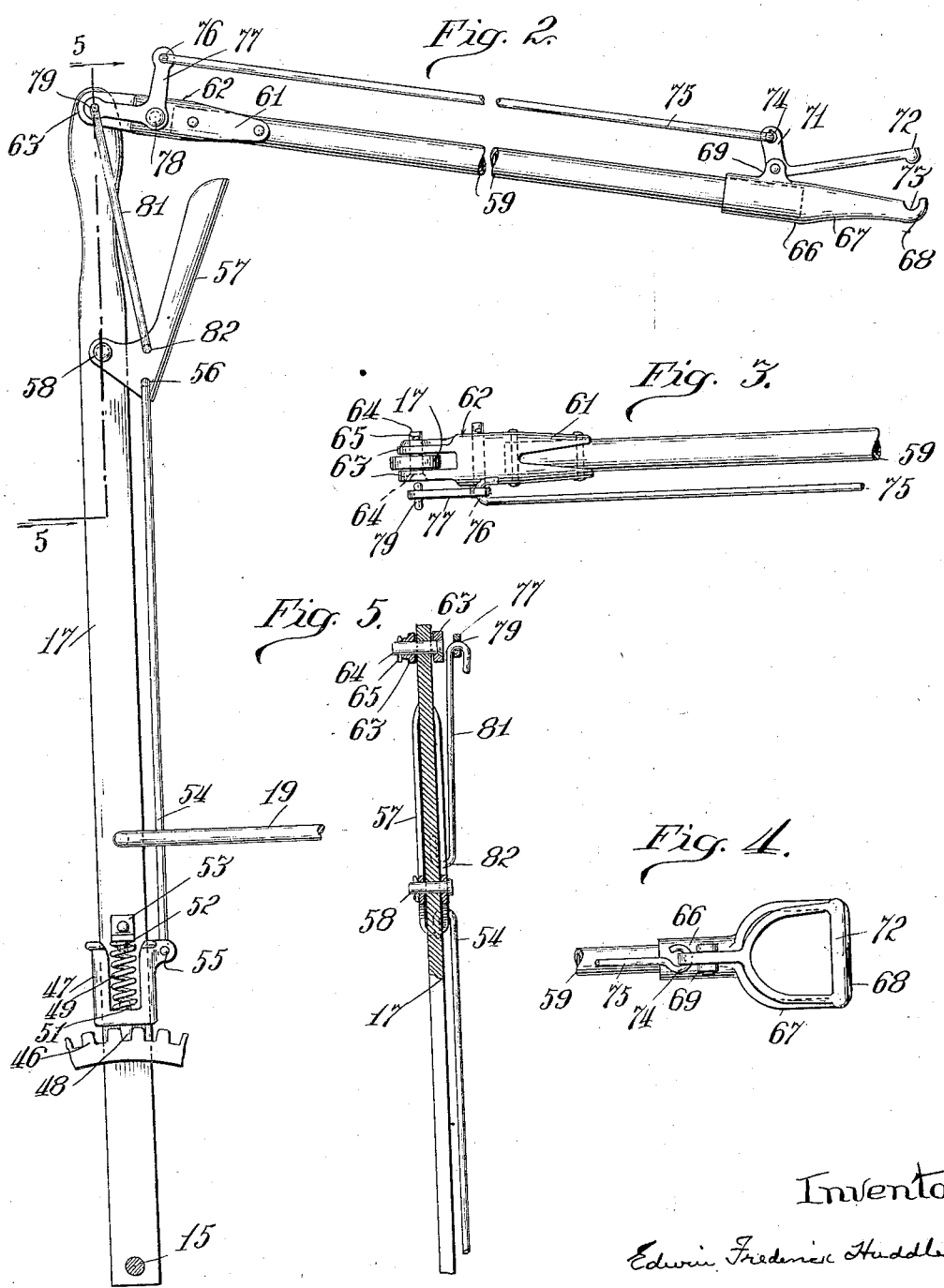

Patented June 7, 1932

1,862,186

UNITED STATES PATENT OFFICE

EDWIN FREDERICK HUDDLE, OF MOLINE, ILLINOIS, ASSIGNOR TO DEERE & COMPANY, OF MOLINE, ILLINOIS, A CORPORATION OF ILLINOIS

EXTENSION CONTROL FOR TRACTOR-DRAWN HARVESTERS

Application filed July 8, 1927. Serial No. 204,218.

The present invention relates to control mechanism for harvesters and like agricultural implements, and aims generally to provide an improved construction and arrangement of extension controls for such implements which can be operated from a driver's position on a tractor pulling the implement.

The conventional grain harvester and binder is usually provided with operating levers for effecting various adjustments from an operator's position on the harvester, such adjustments being represented by the shifting of the binder mechanism, the fore and aft shifting of the reel, the raising and lowering of the reel, and the tilting of the harvester for cutting the grain at different heights. When the implement is pulled by a tractor it is desirable in most instances that extension controls be provided so that the operator of the tractor can perform these various adjustments from his position on the tractor, thus avoiding the necessity of another man on the harvester.

In providing extension controls for this situation it has been one of the objects of the invention to avoid complicated and expensive constructions necessitating the transmission of motion around right angle corners by cranks, links, etc., to avoid the necessity of alined shaft bearings for rotating shaft connections, and to avoid other complications of construction and mounting which have characterized the majority of these prior extension controls. Such object is attained in the present construction by employing a novel arrangement of reciprocable control bars which are connected directly to the control levers on the harvester and extend forwardly therefrom for a push and pull actuating motion from the operator's seat on the tractor. The forward ends of these control bars have sliding support on a strut or rack, which is so supported that the actuating ends of the control bars do not rise and fall to any appreciable degree with the vertical adjustment of the harvester, but remain at all times within convenient reach of the operator on the tractor.

A further object of the invention is to provide extension controls which utilize the latch mechanism of the main control levers for holding the extension controls in their various positions of adjustment, thereby avoiding the necessity of providing separate latch mechanisms for the extension controls; also to provide the extension controls with improved latch-releasing mechanisms for actuating the latch devices on the main control levers. By virtue of the present construction it is possible to perform the above described adjusting operations either from the driver's seat on the tractor or from the harvester, which is oftentimes advantageous.

A further object of the invention is to provide extension controls which can be mounted and dismounted quickly and easily, and which do not necessitate any material alteration of standard harvester construction for their adaptation to a harvester.

Referring to the accompanying drawings illustrating the preferred embodiment of my invention:

Figure 1 is a side view fragmentarily illustrating the harvester and showing the general position and arrangement of the extension controls.

Figure 2 is a fragmentary view on a larger scale, showing the operative connection between one of these extension controls and its associated main lever.

Figure 3 is a fragmentary plan view showing the pivotal connection employed between each of these extension control bars and their associated adjusting levers.

Figure 4 is a fragmentary plan view showing the spade grip handle provided at the end of each of the extension control bars; and Figure 5 is a vertical sectional view through one of the adjusting levers taken on the plane of the line 5—5 of Figure 2.

Referring to Figure 1, I have illustrated, more or less diagrammatically, a portion of a harvester frame comprising a vertical frame bar 7 and two horizontally extending frame bars 8 and 9. One of the wheels of the harvester is illustrated at 11. Pivotally mounted at 12, adjacent the upper end of the vertical frame bar 7, is a rearwardly extending adjusting lever 13, such lever representing a control device whereby the harvester can be tilted for varying the height at which the grain is cut. Secured to horizontal frame bar 8 is a bracket 14 which carries a pivot shaft 15 on which are pivoted three adjusting levers 16, 17 and 18. The first of these levers may be considered as the lever for shifting the binder mechanism; the second as the lever for shifting the reel fore and aft; and the third lever may be considered as the adjusting lever for raising and lowering the reel. Inasmuch as the operating elements and the actuating connections for adjusting these elements are all well known in standard harvester construction, I have not deemed it necessary to illustrate such operating elements nor the actuating connections in complete detail. With respect to the binder adjustments, I have shown the lower end of the lever 16 pivotally connected to a link 10, which, at its forward end, is connected to the upper end of a lever 20, pivoted to the frame at 30. The lower end of such lever is pivotally connected through a link 40 with a bracket 50 secured to a binder head, fragmentarily illustrated at 60. Such binder head is of any common construction, shown as comprising a member 70 which is supported front and rear on rollers 80 mounted on brackets 90 secured to the frame. Only one of such rollers and brackets is shown. With respect to the reel adjustments, I have shown the reel shifting lever 17 connected through a rod 19 with a horizontally swinging arm 21 which carries the reel driving shaft 22 at its upper end, on which shaft the reel is mounted. It will be evident that actuation of the lever 17 will be operative to swing the reel fore and aft by a pivotal movement of the arm 21 around its lower pivot axis 23. Such pivot axis is carried at the end of a vertically swinging arm 24 which is pivoted concentrically with the driving shaft 25. The reel lifting lever 18 has operative connection through a link 26 with a strut 27 extending upwardly from the arm 24, whereby actuation of the lever 18 is operable to move the reel upwardly or downwardly by a pivotal movement of the arms 21 and 24 around the axis of the drive shaft 25.

The rear end of a tractor for pulling the harvester is fragmentarily illustrated at 28, the seat 29 which extends rearwardly therefrom representing an operator's position on the tractor. Draft is transmitted from the tractor to the harvester through a draft connection in the form of a frame or bar 31, which is pivotally connected at its forward end to the draw bar 28a of the tractor as indicated at 32, and which is pivotally connected at its rear end to downwardly turned draft extensions 33 of the harvester frame on pivot pins 34. Referring again to the rearwardly extending adjusting lever 13, it will be noted that such lever is provided with a socket portion 35 extending forwardly beyond the pivot 12 and adapted to receive the shank of an extension lever 36. Also carried by the socket portion 35 is a pivot bracket 86 to which is connected the upper end of a rod 87. The lower end of such rod is pivoted at 88 to the draft connection 31. By virtue of this connection between the lever 13 and the draft connection, when the lever is swung vertically around its pivot 12 the harvester frame will be caused to shift or tilt about the pivot 34. The handle end 36' of the extension lever 36 is disposed in close proximity to the operator's seat 29 on the tractor, and it will also be evident that by swinging this lever upwardly or downwardly the same tilting adjustment will be given the harvester as results from operation of the main lever 13. A toothed quadrant 37 is secured to the frame bar 7, and cooperating with this quadrant is a conventional form of spring-pressed latching dog 38 on the main lever 13. Such latching dog has linked connection with a latch releasing lever 39, which is pivotally connected to the handle extremity of the lever 13, and which serves to release the latching dog as is well understood. This same latching dog is adapted to be released from the handle extremity of extension lever 36, through a latch release lever 41. Extending rearwardly from lever 41 is link 42, which is pivotally connected to the upper arm of a lever 43. The latter is pivotally mounted at 44 on the main adjusting lever 13, and has its lower arm arranged to engage the latching dog 38, or a shoulder thereon, as indicated at 45. It will be evident that squeezing of the latch release grip 41 in the act of grasping the lever handle 36' will release the latching dog 38, thus freeing the secondary or extension lever 36 for performing the harvester tilting adjustment described above. By utilizing a single latching mechanism common to both levers, the tilting operation can be performed either from the tractor seat or from the harvester seat with equal facility.

Each of the other adjusting levers 16, 17 and 18 has latching engagement with an individual toothed quadrant 46, there being three of these quadrants formed in parallel spaced relation on the bracket 14, one for each lever. The latching devices for the levers 16, 17 and 18 are all substantially alike in construction and operation. Referring to Figure 2, the latch mechanism which I preferably employ comprises a reciprocable sleeve member 47 which is guided on the lever and which has a dog 48 for engaging between the teeth of the quadrant 46. One side of the sleeve 47 is recessed to receive a compression spring 49 which bears at its lower end against a stud 51 carried by the sleeve 47, and at its upper end against a stud 52 projecting down from the bracket 53 secured to the side of the lever. A link 54 is pivotally connected to the sleeve 47 at 55, and extends upwardly therefrom for making pivotal connection at 56 with a grip-released latch lever 57. The latter is preferably constructed in the form of a folded stamping having ears which embrace opposite sides of the adjusting lever for receiving a pivot pin 58 passing through the lever. The extension control for each adjusting lever 16, 17 and 18 consists of a bar or rod 59 which is pivotally connected to the handle extremity of the lever and extends forwardly therefrom to a point adjacent the tractor seat 29. Such extension controls are all duplicates, and hence a description of one will suffice for all. The rod or bar 59 is preferably of pipe stock and has its rear end riveted within the bifurcated end 61 of a clevis 62. The latter has two spaced arms 63 which embrace opposite sides of the handle portion of the adjusting lever and are pivoted thereto on a pivot pin 64. This pivot pin passes through a hole in the upper extremity of the handle portion and is detachably held in place by a cotter pin 65.

The forward end of the rod 59 is secured in the tubular socket portion 66 of a handle 67. As shown in Figure 4, such handle is preferably in the form of a spade grip comprising a cross bar portion 68, so that a convenient hold can be had on such handle for imparting a pushing or pulling motion to the rod 59. Projecting upwardly from the tubular socket portion 66 are spaced lugs 69 between which is pivoted a latch releasing lever 71. Such lever is of bell crank formation, comprising a forwardly extending handle also constructed in the form of a spade grip, with a cross bar portion 72. A groove 73 is preferably formed in the cross bar portion 68 of the handle 67 for receiving the cross bar portion 72 of the latch release lever 71. Pivotally connected at 74 to the other arm of this lever is a link 75. At its rear end this link is pivotally connected at 76 to the upright arm of a bell crank lever 77. As shown in Figures 3 and 4 the ends of the link may be formed with hook-like portions for establishing ready pivotal connection with the levers 71 and 77. The bell crank lever 77 is pivotally mounted on a pivot pin 78 extending transversely through the pivotal attaching member 62. The horizontally extending arm of the bell crank lever is connected at 79 to a downwardly extending link 81 which is connected at 82 to the latch release lever 57 of the main adjusting lever. The link 81 also has hook-shaped ends for facilitating the ready establishment of pivotal connections with the levers 57 and 77.

It will be evident that the operating connections just described will enable the latch mechanism of each adjusting lever 16, 17 and 18 to be released from the forward end of its associated extension rod 59, by the mere squeezing of the latch release lever 71 down into the handle 67 in the act of gripping the latter. It should be noted that the pivotal connection 79 between the bell crank 77 and link 81 is alined substantially coincident with the pivotal axis 64 which connects the extension rod to the adjusting lever, whereby relative angular movement between the extension rod and adjusting lever will not affect the position of the latching dog 48.

Referring to Figure 1, the front portions of the three extension control rods 59 rest on a horizontal supporting surface 84, on which the rods have free sliding movement. Such supporting surface is carried at the upper end of a bar or frame 85 which is mounted on the draft connection 31. It will be noted that this supporting surface 84 is disposed in a vertical plane adjacent to the front end of the draft bar so that vertical swinging movement of the rear end of the draft bar, incident to vertical adjustment of the harvester, will have a very slight tendency to swing the front ends of the extension controls upwardly or downwardly. Thus, these extension controls always remain within convenient reach of the operator on the tractor seat 29, irrespective of the vertical adjustment of the harvester.

It will be obvious that a push-pull motion imparted to any of the extension rods 59 will swing the associated levers 16, 17 or 18 and effect the desired adjustment in the same manner that this adjustment would be performed from the harvester. It should also be noted that the installation of the present extension controls does not prohibit the operation of the adjusting levers from the operator's seat on the harvester, as the push-pull rods 59 are free to reciprocate with any adjusting movement given the levers directly. The attachment of the extension controls for the vertical levers 16, 17 and 18 only requires the pivoting of the rods 59 to the handle extremities of such levers, and the establishment of the linked connections between the bell crank levers 77 and the latch release levers 57. The attachment of the horizontal extension lever 36 can also be quickly and easily made, as will be evident from the foregoing description of this lever.

What I claim as my invention and desire to secure by Letters Patent is:

1. In combination, a harvester comprising a plurality of adjusting levers for adjusting different operating parts of said harvester, latches on said levers, latch release levers pivotally mounted on said adjusting levers and operatively connected to said latches, an extension control rod adapted to extend forwardly from each of said levers for actuation from an operator's seat on a tractor pulling said harvester, pivot means connecting the rear end of each of said control rods with its associated lever, handles on the forward ends of said rods adapted to have push-pull movement imparted thereto for reciprocating said rods and thereby swinging said levers, a latch releasing lever pivotally supported on each rod adjacent its handle, a bell crank lever pivotally supported on said rod adjacent to the rear end thereof, a link connecting said bell crank lever with said second named latch release lever, and a link connecting said bell crank lever with said first named latch release lever, the pivotal connection between said second named link and said bell crank lever being disposed in close proximity to the axis of the pivotal connection between said adjusting lever and its associated control rod.

2. The combination with an agricultural implement comprising an adjusting lever pivoted on and actuatable from the implement, of an extension lever connected to and projecting from the pivot portion of said adjusting lever, both of said levers being rigidly secured together and swinging concentrically about the pivot of said adjusting lever as a single unit, said extension lever projecting forwardly from the implement and actuatable from an operator's position on a tractor pulling said implement.

3. The combination of an agricultural implement comprising an adjusting lever pivoted to said implement and actuatable from an operator's position on the implement, an oppositely projecting extension lever rigidly secured to said adjusting lever and actuatable from an operator's position on a tractor pulling said implement, and latch mechanism common to both of said levers.

4. The combination of an agricultural implement comprising a rearwardly extending adjusting lever pivoted thereon, an extension lever rigidly connected to said adjusting lever and extending forwardly for actuation from an operator's seat on a tractor pulling said implement, said extension lever swinging vertically about the same pivot as said first mentioned lever, a latching quadrant concentric with said pivot, a latching dog carried by one of said levers and cooperating with said quadrant for holding both of said levers in locked position, and means actuatable from either lever for releasing said dog.

5. The combination of a harvester comprising a rearwardly extending adjusting lever pivoted thereon, a draft member for connecting said harvester to a tractor, means connecting said lever to said draft member whereby actuation of said lever is operable to tilt said harvester, a latching quadrant, a latching dog carried on said adjusting lever for cooperation with said quadrant, a socket at the forward end of said adjusting lever, an extension lever secured at its rear end in said socket and extending forwardly for actuation from an operator's seat on said tractor, and latch release devices on each of said levers operatively connected with said latching dog whereby the latter can be released from either lever.

6. In combination, a harvester comprising a plurality of adjusting levers for adjusting different operating parts of said harvester, latches on said levers, latch release levers pivotally mounted on said adjusting levers and operatively connected to said latches, an extension control rod adapted to extend forwardly from each of said levers for actuation from an operator's seat on a tractor pulling said harvester, pivot means connecting the rear end of each of said control rods with its associated lever, handles on the forward ends of said rods adapted to have push-pull movement imparted thereto for reciprocating said rods and thereby swinging said levers, a latch releasing lever pivotally supported on each rod adjacent its handle, a bell crank lever pivotally supported on said rod adjacent to the rear end thereof, a link connecting said bell crank lever with said second named latch release lever, and a link connecting said bell crank lever with said first named latch release lever.

7. In a farm implement, an adjusting lever, a dog for holding the lever in any selected one of a plurality of positions, an extension rod pivoted at its rear end to the lever, an auxiliary lever pivoted to the extension rod, a link for controlling said dog pivoted to the auxiliary lever substantially coaxially with the pivotal connection between the extension rod and the adjusting lever, and means for controlling the auxiliary lever from the front end of the extension rod.

8. In combination, a harvester comprising an adjusting lever, a latch on said lever, a latch release lever pivotally mounted on said adjusting lever and operatively connected to said latch, an extension control rod adapted to extend forwardly from said lever for actuation from an operator's seat on a tractor pulling said harvester, pivot means connecting the rear end of said control rod with said lever, a handle on the forward end of said rod adapted to have push-pull movement imparted thereto for reciprocating said rod and thereby swinging said lever, a latch releasing lever pivotally supported on said rod adjacent said handle, a bell crank lever pivotally supported on said rod adjacent to the rear end thereof, a link connecting said bell crank lever with said first-named latch release lever, a link connecting said bell crank lever with said second-named latch releasing lever, the pivotal connection between said first-named link and said bell crank lever being disposed in close proximity to the axis of the pivotal connection between said adjusting lever and its associated control rod.

9. In combination, an implement comprising an adjusting lever, a latch on said lever, a latch release lever pivotally mounted on said adjusting lever and operatively connected to said latch, an extension control rod adapted to extend forwardly from said lever for actuation from an operator's seat on a tractor pulling said implement, pivot means connecting the rear end of said control rod with said lever, a handle on the forward end of said rod adapted to have push-pull movement imparted thereto for reciprocating said rod and thereby swinging said lever, a bell crank lever pivotally supported on said rod adjacent to the rear end thereof, means extending to the forward end of the handle for rocking said bell crank lever, a link connecting said bell crank lever with said latch release lever, the pivotal connection between said second-named link and said bell crank lever being disposed in close proximity to the axis of the pivotal connection between said adjusting lever and its associated control rod.

10. In combination, an implement comprising an adjusting lever, a latch on said lever, a latch release lever pivotally mounted on said adjusting lever and operatively connected to said latch, an extension control rod adapted to extend forwardly from said lever for actuation from an operator's seat on a tractor pulling said implement, pivot means connecting the rear end of said control rod with said lever, a handle on the forward end of said rod adapted to have push-pull movement imparted thereto for reciprocating said rod and thereby swinging said lever, a latch releasing lever pivotally supported on said rod adjacent its handle, a bell crank lever pivotally supported on said rod adjacent to the rear end thereof, a link connecting said bell crank lever with said second-named latch release lever, and a link connecting said bell crank lever with said first-named latch release lever.

11. In a farm implement, an adjusting lever, a latch for holding the lever in any one of a plurality of positions, an extension lever pivoted at one end to said adjusting lever, an auxiliary lever pivoted to one of said other levers, a link for controlling said latch and pivotally connected to said auxiliary lever, and a second link pivoted to said auxiliary lever and extending to the free end of said extension lever, the pivotal connection between one of said links and said auxiliary lever being substantially coaxial with the pivotal connection between the adjusting lever and the extension lever.

12. A remote control attachment for a farm implement adjusting lever pivotally mounted on the implement and provided with a latch for holding it in any selected one of a plurality of positions and provided with control mechanism for the latch extending to the free end of the lever, comprising an extension rod capable of withstanding compressive stresses and provided at its rear end with a pivot by which it may be connected to the free end of the lever, an auxiliary lever pivotally mounted on said rod near said rear end, a link connected to one end of said auxiliary lever at a point in line with said pivot and adapted to be connected to the control mechanism of the lever, and a link pivotally connected to the other end of said auxiliary lever and extending to the free end of said rod whereby said auxiliary lever may be rocked by fore and aft movement of said last named link relative to said rod.

EDWIN FREDERICK HUDDLE.